July 16, 1963

R. L. LINCOLN 3,097,936

DUST COLLECTOR CONTROL SYSTEM

Filed Sept. 30, 1960

INVENTOR.
ROLAND L. LINCOLN

ATTORNEYS

July 16, 1963 R. L. LINCOLN 3,097,936
DUST COLLECTOR CONTROL SYSTEM
Filed Sept. 30, 1960 2 Sheets-Sheet 2

INVENTOR.
ROLAND L. LINCOLN

BY
ATTORNEYS

United States Patent Office 3,097,936
Patented July 16, 1963

3,097,936
DUST COLLECTOR CONTROL SYSTEM
Roland L. Lincoln, Macungie, Pa., assignor to
Fuller Company, a corporation of Delaware
Filed Sept. 30, 1960, Ser. No. 59,691
20 Claims. (Cl. 55—273)

The present invention relates to control systems, and is concerned more particularly with the synchronization and sequence regulation of the periodic cleaning cycles of multiple-unit dust collectors.

Ordinarily, the "timers" used in connection with dust collectors require one cam and one switch, or a corresponding individual actuator for each separate operation in each compartment. Therefore, in a six-compartment dust collector having three operating stages in the cleaning cycle of each chamber, eighteen individual actuators or switches are required. In normal operation of such dust collectors, one compartment at a time is cleaned, while the remainder of the compartments continue on stream to filter dust. Therefore, it is necessary that the sequence of the cleaning cycles of the various chambers be accurately adjusted in the timer. Furthermore, a definite synchronization of actuation is generally necessary among the several operations comprising a cleaning cycle, such as the delaying of the supply of air for reverse flushing until the compartment has been isolated from the incoming dust-laden gases by a main damper.

In such prior installations, it has been necessary that each cam, switch, or corresponding actuator be individually and very accurately adjusted to provide proper synchronization wth respect to the other cams, switches or corresponding actuators. Under the circumstances the design, and particularly the set-up and installation of such circuits become extremely complex, and any interference with the original adjustment, such as when it is desired to lengthen or to shorten the periods between cleaning cycles, requires complete readjustment of each element of the entire circuit.

The present invention provides for the simultaneous operation of corresponding valves of each compartment, or corresponding cleaning cycle operations of each compartment, but cancels the effect of the valves or cleaning operations of the compartments which are to remain on stream to collect dust, so that only in the compartment to be cleaned are the appropriate operations of the cleaning cycle in effect at any given time.

In general, the present invention comprises a cycling control system having a two-stage timer with one stage being energized by, or serially connected through the other stage of the timer. The first stage of the timer includes a number of switches or actuators corresponding to the number of compartments in the dust collector installation, which are connected to the source of energy used to open the valves or operating apparatus of each compartment so that only the valves or operating apparatus of one compartment is actuated during a given cleaning cycle, notwithstanding the parallel connection of all corresponding valves of all compartments. The second stage of the timer, which is actuated by the first stage, contains a number of cams and switches or other actuating means equal in number to the separate operations carried out during the cleaning cycle of a compartment. The switches of this stage of the timer are connected in parallel with the corresponding valves for operating apparatus of each compartment.

A better understanding of the invention may be derived from the accompanying description and drawings, in which.

Figure 1:
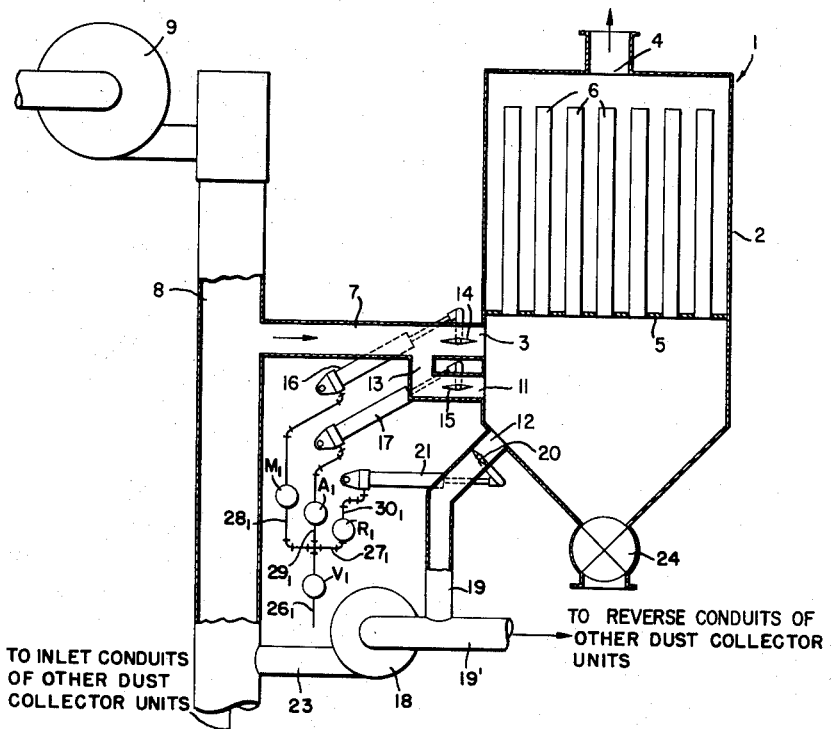
FIG. 1 is a schematic view of a compartment of a multi-compartment bag-type dust collector, showing the communication of the control system with the valves of the compartment.

As shown in FIG. 1, the dust collector includes a plurality of compartments, such as the compartment 1 comprising a casing or bag house 2 having an inlet 3 in its lower region and an outlet 4 in its upper region, with a suitable crown sheet 5 and filter bag assembly 6 interposed between the inlet 3 and the outlet 4. The inlet 3 to the compartment communicates by way of a conduit 7 with a main supply conduit 8 extending thereto from a fan 9 which exhausts the source of dust. Although a forced-draft system is disclosed, it is to be understood that the invention is equally applicable to an induced-draft system, in which case the intake of the fan would be connected to outlet 4 and would exhaust casing 2 through that outlet. The lower portion of the casing 2 also includes an auxiliary inlet 11 and a reversal air port 12. The auxiliary inlet 11 communicates with the conduit 7 by means of a branch conduit 13. Conduit 7 has a valve 14 therein and the branch conduit 13 has a valve 15 therein, with the valves 14 and 15 being actuated by pneumatic cylinders 16 and 17, respectively. The reverse air port 12 communicates with a reverse air fan 18 via a branch conduit 19 and a main conduit 19' leading to the intake of the air fan. The main conduit has branch conduits connected to reversal-air ports or other dust collector units of the system through conduits similar to the branch conduit 19. The conduit 19 has a valve 20 therein. The valve 20 is actuated by a pneumatic cylinder 21. The reverse air fan 18 is arranged to draw gases from the lower part of casing 2 through the reverse air port 12 and to discharge such gases into the main supply duct 8 through a conduit 23.

Dust accummulating in the lower part of casing 2 after its removal from the filter bags 6 is discharged through a suitable gate 24.

Each of the several compartments of the dust collector installation are individually connected to the main supply duct 8 in a manner similar to that shown for compartment 1. For convenience in description, a six-compartment collector control system is diagrammatically represented in FIG. 2, but it is to be understood that any number of compartments may be used as described more fully hereinafter.

Figure 2:
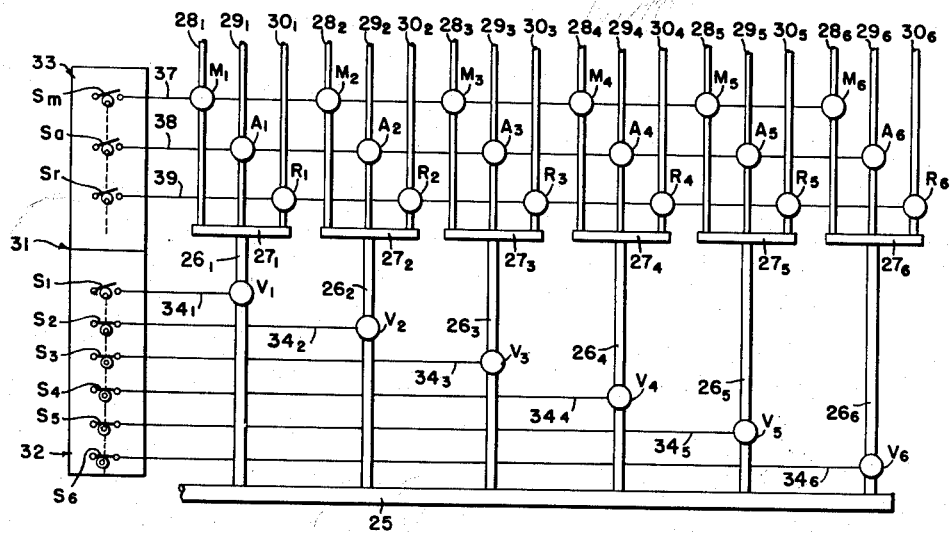
FIG. 2 is a schematic diagram of the control system with the timer represented in a longitudinal scheme.

As shown in FIG. 2, a main compressed air supply line 25 communicates by a plurality of individual branch conduits $26_1$ through $26_6$, with a corresponding plurality of manifolds $27_1$ through $27_6$, respectively. The branch conduits $26_1$ through $26_6$ are provided with individual solenoid-controlled valves $V_1$ through $V_6$, respectively.

The manifolds $27_1$ through $27_6$ each have three conduits $28_1$ through $28_6$; $29_1$ through $29_6$ and $30_1$ through $30_6$ extending therefrom and communicating with pneumatic cylinders, such as pneumatic cylinders 16, 17 and 21 connected to branch conduits $28_1$, $29_1$ and $30_1$, respectively, of the several dust-collecting units, as shown in FIG. 1.

The branch conduits $28_1$ to $28_6$; $29_1$ to $29_6$ and $30_1$ to $30_6$ are provided with individual solenoid-controlled valves $M_1$ to $M_6$, $A_1$ to $A_6$ and $R_1$ to $R_6$, respectively.

The operation of the solenoid-controlled valves $V_1$ through $V_6$, $M_1$ through $M_6$, $A_1$ through $A_6$ and $R_1$ through $R_6$ is controlled by a timer 31 which may be of the rotating disc, rotating drum or other suitable type, for example, a timer of the general type shown in McBerty Patent No. 1,105,811. The timer includes a first stage 32 for controlling the operation of the solenoid-controlled valves $V_1$ to $V_6$ and a second stage 33 which controls the operation of the solenoid-controlled valves $M_1$ to $M_6$, $A_1$ to $A_6$ and $R_1$ to $R_6$.

The first stage 32 of the timer which controls the operation of valves $V_1$ through $V_6$ includes six cam-operated switches $S_1$ through $S_6$ which are connected individually by lines $34_1$ to $34_6$, respectively, with the valves $V_1$ through $V_6$. The cams for operating the switches $S_1$ through $S_6$ are mounted on a cam shaft driven by a motor 35 in a conventional manner.

The second stage 33 of the timer includes three cam-actuated switches $S_m$, $S_a$ and $S_r$. The cams of these switches are mounted on a cam shaft driven by a motor 36 in a conventional manner. Switch $S_m$ is connected by means of wiring 37 to each of the solenoid-operated valves $M_1$ through $M_6$. Correspondingly, switch $S_a$ and switch $S_r$ are connected by wiring 38 and 39, respectively, with each of solenoid-operated valves $A_1$ through $A_6$ and each of solenoid-operated valves $R_1$ through $R_6$, respectively.

Figure 3:
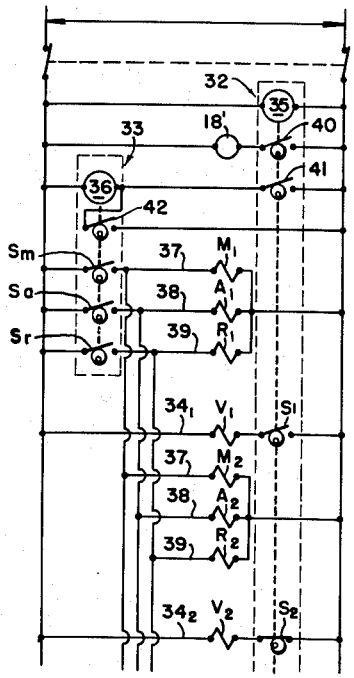
FIG. 3 is a longitudinal wiring diagram of the timer of FIG. 2.

In the operation of the apparatus in FIGS. 1 to 3, when one of the compartments, such as the compartment 1, is to be cleaned according to a preset frequency of cleaning, the motor 35 of the first stage 32 of the timer 31 is started and actuates the cams of cam-actuated switches 40 and 41 to close those switches. The closing of switch 40 also starts motor 18' of the air fan to exhaust gas from the casing 2 to effect reverse-flow-gas cleaning of the filter bags; while the closing of switch 41 starts the motor 36 of the second stage of the timer 31. The motor 36 then actuates the cam of a hold-in switch 42 to close that switch and hold it closed for the full cycle of the cleaning period of the bags of one of the bag compartments, for instance, ninety seconds.

The energizing of the motor 36 of the second stage of the timer 31 causes the switches $S_m$ and $S_a$ to be closed. This energizes the solenoids of valves $M_1$ and $A_1$ to open those valves and permit the air to flow through conduits $28_1$ and $29_1$ to pneumatic cylinders 16 and 17, respectively, to cause the closing of the dampers 14 and 20, respectively, in the main and auxiliary inlet conduits to shut off the admission of dust-laden gas to the casing 2. After valves $M_1$ and $A_1$ have been opened for the preset time, the cam for switch $S_r$ is actuated to close that switch to energize the solenoid of valve $R_1$ to open that valve to permit air to flow through conduit $30_1$ to pneumatic cylinder 21 to cause the damper 20 in the exhaust conduit 19 to open. The dust collector unit is now in a condition, upon the starting of air fan 18, for air to be exhausted from the casing 2 to cause reverse flow of air through the filter bags for the removal of dust accumulated on their inner walls. Valves $M_2$ through $M_6$ and $A_2$ through $A_6$ are opened simultaneously with the opening of valves $M_1$ and $A_1$. Similarly, valves $R_2$ through $R_6$ are opened simultaneously with the opening of valve $R_1$. However, although all these valves $M_2$ through $M_6$, $A_2$ through $A_6$ and $R_2$ through $R_6$ are opened, they have no effect upon the compartments with which they are respectively associated, unless compressed air is delivered through those valves to their respective pneumatic cylinders 16, 17 and 21, respectively.

Each time that the first stage 32 of the timer is actuated, only one of the switches $S_1$ through $S_6$ is actuated. Thus, compressed air is delivered only through one of the manifolds $27_1$ through $27_6$ and associated groups of valves to effect delivery of air to the respective pneumatic cylinders of only one of the compartments. Hence, when compartment 1 is being cleaned, only the valve $V_1$ is opened while the remainder of valves $V_2$ through $V_6$ are closed and compressed air is delivered only through valves $M_1$, $A_1$ and $R_1$, while the remainder of the M, A and R valves have no air passing through them, and, in a sense, idle.

On the operation of the second stage 33 of the timer, switch $S_r$ is opened, thereby de-energizing the solenoid of solenoid-controlled valve $R_1$ to cause that valve to close and to relieve the pressure from the pneumatic cylinder 21, thereby causing the damper 20 to be closed to stop the exhaustion of air from the casing through the exhaust conduit 19. The switch $S_a$ is then opened, thereby de-energizing the solenoid of solenoid-controlled valve $A_1$ and causing that valve to close. This relieves the pressure from pneumatic cylinder 17 to permit auxiliary damper 15 to open to admit a limited amount of dust-laden gas to the casing 2 to pre-pressurize and pre-stress the bags 6. As soon as the bags have been pre-pressurized and pre-stressed, the time mechanism causes switch $S_m$ to open, which in turn de-energizes the solenoid of solenoid-controlled valve $M_1$ to cause that valve to close, thereby relieving the pressure on pneumatic cylinder 16 and permitting the main air damper 14 to open to resume delivery of the full load of dust-laden gas to the casing 2.

After switch $S_m$ has been opened and delivery of dust-laden gas to the casing 2 is thus resumed, the cycle of the second stage 33 of the timer is completed by opening of the hold-in switch 42. This de-energizes the second stage 33 of the timer in preparation for a further cleaning cycle upon actuation of the first stage 32 of the timer by reclosing of switches 40 and 41. Continued operation of first stage 32 of the timer closes switch $S_2$, which causes the opening of valve $V_2$ and the concurrent closing of switches 40 and 41 to again start the motor of the reverse air fan 18 and simultaneously energize motor 36 of the second stage 33 of the timer to close switches $S_m$ and $S_a$ and subsequently switch $S_r$ so that valves $M_1$ through $M_6$ and valves $A_1$ through $A_6$ are first opened, and the valves $R_1$ through $R_6$ subsequently are opened, as heretofore described. Since only valve $V_2$ is then open, the opening of the several M, A and R valves is effective only on the second compartment. On termination of the cleaning of the second compartment, first by reclosure of all of the R valves, then by opening of all of the A valves and then by opening all of the M valves, the hold-in switch 42 again opens, releasing the first stage of the timer for subsequent opening of valve $V_3$.

The invention hase been described with reference to FIGS. 1 through 3 in a relatively simple form. When additional operations within the cleaning cycle are desired, such as the inclusion of cleaning by means of sonic or supersonic waves as disclosed in the patent to Abboud No. 2,769,506, issued November 6, 1956, or the inclusion of any other separate operation, modifications of the system of FIG. 1 may be advantageous. Where sonic or supersonic cleaning is to be incorporated, it may well be that the source of compressed air for actuation of the M, A and R valves will be of sufficient volume and pressure to operate the "sound generator," or generators for each compartment. The terms "sound generator," "sonic" and "sound" are used herein in a broad sense including both the so-called sonic and supersonic frequencies. If the source of compressed air is of sufficient volume and pressure to serve the purposes of the sound generator, which may be such as an air whistle or an air horn, such generator may be served by an additional pipe taken off the manifolds $27_1$ to $27_6$ serving the respective compartments.

Where the sound generator requires a different pressure of compressed air or is electrically actuated, or for any other reason requires a separate operational source, it is advantageous to interlock the operation of the generator or generators of each compartment with the operation of the corresponding valve of each compartment. As shown on FIGS. 4 and 5, the compressed air line 250 serves a plurality of manifolds $270_1$, $270_2$, etc., through individual air conduits $260_1$, $260_2$, etc., and solenoid-operated valves $V_1$, $V_2$, etc. Manifolds $270_1$, etc., serve the various compartments through individual pipes $280_1$, $280_2$, etc.; $290_1$, $290_2$, etc.; and $300_1$, $300_2$, etc., leading to actuating apparatus of the given compartment. The pipes $280_1$, $280_2$, etc., are provided with solenoid-operated valves $M'_1$, $M'_2$, etc., respectively. Similarly, pipes $290_1$, $290_2$, etc., are provided with solenoid-operated valves $A'_1$, $A'_2$, etc., and pipes $300_1$, $300_2$, etc., are provided with valves $R'_1$, $R'_2$, etc., respectively. Air conduits $46_1$, $46_2$, etc., are connected to a compressed air line 47 and supply operating air to sound generators $48_1$, $48_2$, etc., located in the respective dust-separating compartments. The passage of air through the conduits $46_1$, $46_2$, etc., is controlled by solenoid-controlled valves $G_1$, $G_2$, etc.

The timer 31' includes in its first stage 32' a series of cam-operated switches $S'_1$, $S'_2$, etc., and in its second stage 33', a series of cam-operated switches $S'_m$, $S'_a$ and $S'_r$.

Figure 5:
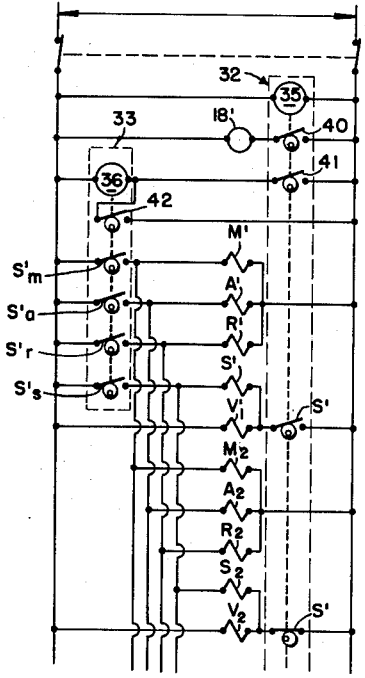
FIG. 5 is a longitudinal wiring diagram of the timer of FIG. 4.
Figure 4:
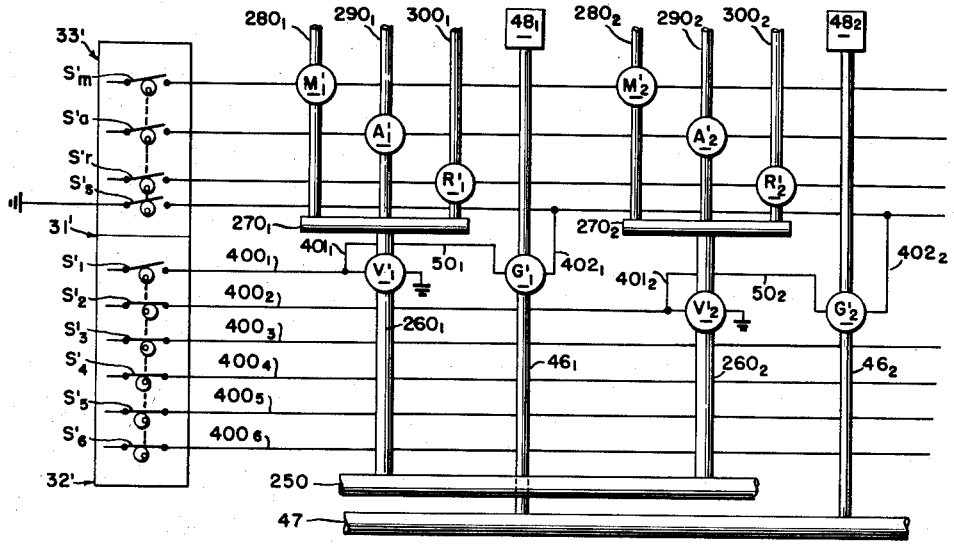
FIG. 4 is a schematic diagram of a modified control system.

The switches $S'_1$, $S'_2$, etc., communicate by means of lines $400_1$, $400_2$, etc., with valves $V_1$, $V_2$, etc. In adddition, lines $50_1$, $50_2$, etc., individually branch off from lines $400_1$, $400_2$, etc., and connect with solenoid-operated valves $G_1$, $G_2$ etc., in a manner such that when the solenoid of a given valve, such as valve $V_1$, is energized to open its valve, the circuit of one side of the corresponding solenoid of valve $G_1$ is simultaneously closed by switch $S'_1$. The circuit to the opposite side of the solenoid of valve $G_1$ is closed by switch $S'_s$ in the second timer stage 33', which is similar to switches $S'_m$, $S'_a$ and $S'_r$, and is similarly wired in parallel to all valves $G_1$, $G_2$, etc. However, since only one valve ($G_1$ in the present instance) has its solenoid closed in the first circuit $400_1$ through switch $S'_1$, the system operates to open only that valve and to start only that sound generator which is associated with the compartment served by the opened valve $V'_1$. In other respects the operation of the control system of FIGS. 4 and 5 is the same as that of FIGS. 1 to 3.

Various changes may be made in the details of construction of the control system herein described without departing from the invention or sacrificing any of the advantages thereof.

I claim:

1. A dust collector system comprising a plurality of dust collector units, each dust collector unit including a casing having an inlet for dust-laden gas, an outlet for filtered gas, a filter medium therein and in the path of the flow of gas from the inlet to the outlet and an exhaust outlet at the side of the casing, with respect to the filter medium, at which the inlet is located, an inlet conduit connected to the inlet of each casing, an exhaust conduit connected to the exhaust outlet of each casing, means for causing a flow of dust-laden gas through each inlet conduit into its connected casing, means for withdrawing gas from each casing through its connected exhaust conduit for reverse-gas-flow cleaning of the respective filter mediums, a valve in each inlet conduit for controlling the flow of dust-laden gas therethrough into the connected casing, a valve in each exhaust conduit for controlling the flow of gas therethrough from the casing, means for opening and closing the valves in the respective inlet conduits, means for opening and closing the valves in the respective exhaust conduits, a main supply line for a medium for actuating the valve opening and closing means for the valves in the inlet conduits and the valves in the exhaust conduits, a main branch line leading from said main supply line for each dust collector unit, a manifold, each of said main branch lines being connected to said manifold, branch lines leading from each of said manifolds to the means for opening and closing the valves in the inlet and exhaust conduits of the respective dust collector units for the conduction of an actuating force to said means, means for controlling the transmission of the actuating force through the main branch lines leading from the main supply line to the respective manifolds, means for controlling the flow of the actuating force from the respective manifolds through each of the branch lines leading therefrom to the means for opening and closing the valves in the inlet and exhaust conduits, a timer having a first stage and a second stage, switches in the first stage of the timer which selectively control the actuation of the means for controlling the flow of the actuating force from the main supply line through the respective main branch lines to the respective manifolds, switches in the second stage of the timer for selectively controlling the actuation of the means for controlling the flow of the actuating force from the respective manifolds through the respective branch lines leading to the means for opening and closing the respective valves in the inlet and exhaust conduits of the respective dust collector units, and means for selectively actuating said switches of the timer of the respective dust collector units in a predetermined series arrangement to cause the actuating force to be supplied to the actuating means for the valve in the inlet conduit of at least one, but not all, of the dust collector units to close the valves in said inlet conduit and for causing the actuating force to be supplied to the actuating means for the valve in the exhaust conduit of the same dust collector unit to open that valve, whereby predetermined ones of said dust collector units may be subjected to reverse-gas-flow cleaning while the remainder of the dust collector units continue to filter dust-laden gases.

2. A dust collector system, as defined in claim 1, in which the means for opening and closing the valves in the respective inlet and exhaust conduits are fluid-responsive, the actuating force for opening and closing the valves in the inlet and exhaust conduits is adapted to be a fluid, and the main supply line, the respective manifolds, the main branch lines leading from the main supply line to the respective manifolds and the branch lines leading from the manifolds to the respective actuating means for opening and closing the valves in the respective inlet and exhaust conduits are fluid-conducting conduits.

3. A dust collector system, as defined in claim 2, in which the means for controlling the transmission of the fluid through the respective branch lines are solenoid-actuated valves.

4. A dust collector system, as defined in claim 1, in which the timer is set to cause the closing of the valve in the inlet conduit and the opening of the valve in the exhaust conduit of only one dust collector unit at a time.

5. A dust collector system, as defined in claim 1, having common means for supplying dust-laden gas to all of the dust collector casings.

6. A dust collector system, as defined in claim 1, having common means for exhausting gas from all of the dust collector casings through the respective exhaust conduits.

7. A dust collector system, as defined in claim 3, in which the timer is set to selectively actuate the switches in the second stage of the timer to cause the valves in the branch lines leading from the manifolds to the respective means for opening and closing the valves in the inlet and exhaust conduits to be opened before the switches in the first stage of the timer are actuated to selectively open the valves in the main branch lines leading from the main supply line to the respective manifolds.

8. A dust collector system, as defined in claim 1, which includes a motor in each stage of the timer for causing the opening and closing of the switches therein, means for supplying electric current to the motor of each stage of the timer, additional switch means in the first stage of the timer controlling the transmission of electric current to the motor of the second stage of the timer, and means actuated by the motor in the first stage of the timer for opening and closing said additional switch means.

9. A dust collector system, as defined in claim 8, which includes a hold-in switch in the second stage of the timer which is preset to be held closed for a predetermined cleaning cycle of the dust bags, and means actuated by the motor of the second stage of the timer for opening and closing said hold-in switch.

10. A dust collector system, as defined in claim 1, in which the means for controlling the transmission of the actuating force through the branch lines leading from the respective manifolds to the respective means for opening and closing the valves in the inlet and exhaust conduits is controlled independently of the means for controlling the transmission of the actuating force from the main supply line to the respective manifolds, and which includes means for selectively actuating the means for controlling the transmission of the actuating force from the main branch lines to the respective manifolds.

11. A dust collector system, as defined in claim 1, in which the timer is set to actuate only one of the switches in the first stage thereof when that stage of the timer is actuated, to cause the means for controlling the transmission of the actuating force from the main supply line to the respective manifolds to be actuated to permit transmission of the actuating force from the main supply line to the respective manifolds.

12. A dust collector system, as defined in claim 1, which includes an auxiliary inlet conduit communicating with the casing of each dust collector unit, a valve in each auxiliary conduit for controlling the transmission of gas therethrough and into the associated casing, means for operating the valve in each auxiliary conduit to move it selectively to open and closed positions, a branch line extending from the respective manifolds to the operating means for the valves in the respective auxiliary inlets to supply an actuating force to such operating means, means for controlling the transmission of the actuating force through each branch line leading to the operating means for the valve in each auxiliary inlet, and switch means in the second stage of the timer for selectively controlling the means for controlling the transmission of the actuating force from the respective manifolds through the respective branch lines leading to the operating means for the valves in the respective auxiliary conduits.

13. A dust collecting system, as defined in claim 10, in which the respective auxiliary conduits are connected to and receive dust-laden gas from the respective inlet conduits.

14. A dust collector system, as defined in claim 12, in which the second stage of the timer is so set that after the valves in the inlet and auxiliary conduits have been closed and the valve in the exhaust conduit has been opened for a cleaning cycle, the switch therein which controls the actuation of the means for controlling the transmission of the actuating force from the manifold to the means for opening and closing the valve in the auxiliary inlet is actuated to cause such control means to be actuated to open the valve in the auxiliary conduit before the valve in the inlet conduit is opened, whereby the gas flowing through the auxiliary inlet conduit into the casing will pre-pressurize or pre-stress the bags before gas enters the casing from the inlet conduit.

15. A dust collector system, as defined in claim 14, in which the second stage of the timer is so set that the means for controlling the transmission of the actuating force from the manifold to the means for opening and closing the valve in the exhaust conduit is actuated to cause transmission of the actuating force to such means for opening and closing the valve in the exhaust conduit to close said valve prior to the opening of the valve in the auxiliary inlet.

16. A dust collector system, as defined in claim 1, in which a sonic wave generator is located in the casing of each dust collector unit, a branch line connects the main supply line with the sonic wave generator for supplying an actuating force to said sonic wave generator, means in said branch line leading to the sonic wave generator for controlling the transmission of the actuating force therethrough, and switch means in said timer for controlling the actuation of the control means in the branch line leading to the sonic wave generator.

17. A dust collector system, as defined in claim 16, in which the switch means for actuating the control means in the branch line leading from the main supply line to the sonic wave generator is in the first stage of the timer.

18. A dust collector system, as defined in claim 17, in which the respective switches in the first stage of the timer which control the actuation of the means for controlling the transmission of the actuating force from the main supply line to the respective manifolds also control the actuation of the control means in the respective branch lines leading from the main supply line to the respective sonic wave generators.

19. A dust collector system, as defined in claim 16, in which the sonic wave generator is air operated and the main supply line and the branch line leading therefrom to the sonic wave generator are pipes for the conduction of air under pressure.

20. A dust collector system comprising a plurality of dust collector units each including a casing having a gas inlet for dust-laden gas and a gas outlet for cleaned gas, separating means for removing and accumulating dust from gases passing through each casing, cleaning means for removing accumulated dust from each separating means, the cleaning means including at least a first operating stage and a second operating stage for effecting different operations of the cleaning cycle, a plurality of actuators individually associated with the first and second operating stages, a timer having a first timer stage and a second timer stage, a first switch in the second timer stage operatively connected in common to the actuators of the first operating stages of the several collector units for simultaneous initial actuation of those stages, a second switch in the second timer stage operatively connected in common to the actuators of the second operating stages of the several collector units for simultaneous initial actuation of those stages, a plurality of switches in the first timer stage each operatively connected to the actuators of both the first and second operating stages of one of the individual collector units for selective full actuation of the cleaning means of the several collector units, and sequence means for causing the switches of the timer to actuate the cleaning means of only a select number of collector units at a time by full actuation of only those operating stages which are associated with the selected collector units.

References Cited in the file of this patent
UNITED STATES PATENTS

| | | |
|---|---|---|
| 1,630,482 | Forbes | May 31, 1927 |
| 1,907,197 | Dorfan | May 2, 1933 |
| 2,854,091 | Roberts et al. | Sept. 30, 1958 |